June 23, 1931.   W. P. WIEMANN   1,811,771
INTERNAL COMBUSTION ENGINE
Filed July 23, 1929
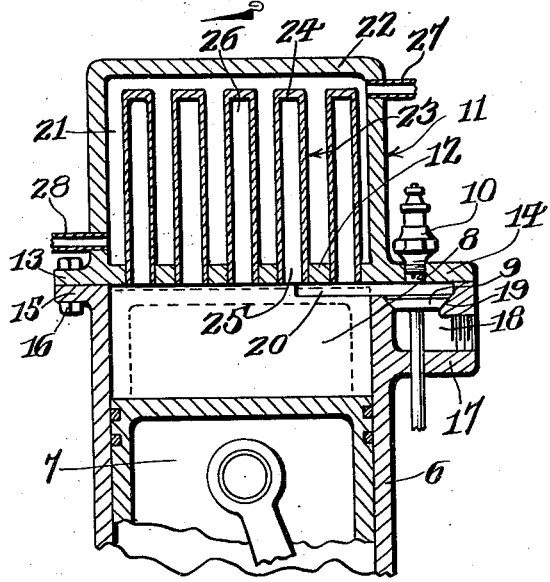
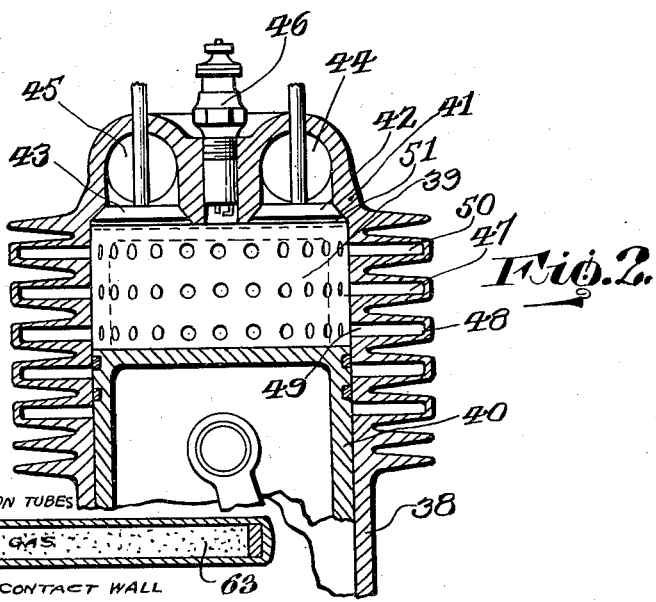
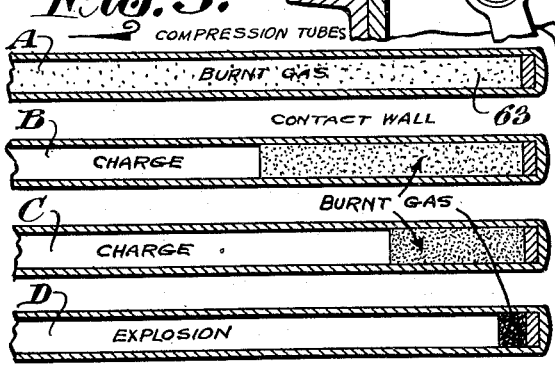
INVENTOR.
William P. Wiemann,
BY
Geo. P. Kimmel
ATTORNEY.

Patented June 23, 1931

1,811,771

UNITED STATES PATENT OFFICE

WILLIAM P. WIEMANN, OF PITTSBURGH, PENNSYLVANIA

INTERNAL COMBUSTION ENGINE

Application filed July 23, 1929. Serial No. 380,386.

This invention relates to internal combustion engines of the Otto four cycle type, and has for its object to provide, an engine of the type referred to with means to secure more complete combustion of the explosive charge, supplied to the cylinder of the engine, by preventing the contamination of such charge by products of combustion, burnt gas or gases from previous combusted or exploded charges retained in the compression space.

Further objects of the invention are to provide, in a manner as hereinafter set forth, an internal combustion engine with means to secure more complete combustion of the incoming charge through all phases of load and speeds; to secure economy of fuel and increased power by preventing contamination of the incoming charge by admixture with the burnt gas retained in the compression space from previous explosions; to provide against the generation of deadly carbon monoxide gas by maintaining the proper ratio mixture of gas and air as furnished by the carburetor; and provide radiation surface external from the cylinder for air cooling.

With the foregoing and other objects in view the invention consists of the novel construction, combination and arrangement of parts as hereinafter set forth, and illustrated in the accompanying drawings wherein are shown embodiments of the invention, but it is to be understood that changes, variations and modifications can be had which fall within the scope of the claims hereunto appended.

In the drawings:—

Figure 1 is a fragmentary view in vertical section of an internal combustion engine or motor constructed in accordance with this invention to secure complete combustion of the explosive charge.

Figure 2 is a view similar to Figure 1 of another modification to secure complete combustion of the explosive charge.

Figure 3 is a diagrammatical view showing the various positions of the inert or burnt gas within the external compression space.

The standard Otto cycle engine contains a fixed cylinder extension or compression space, the volumetric ratio being about 5 to 1, during the exhaust stroke $4/5$ of the burnt gas is discharged, one-fifth being retained in the compression space. During the suction stroke, the new charge is mixed with the one-fifth burnt gas remaining in the compression space through turbulation. Now, if the thermal value of the new charge is 100%, the value after the mixture falls to 80%, a loss of 20% on full load. This loss increases very rapidly as the load decreases, in fact, falling as low as 20% when idling the engine. This is followed at the same rate by an increase of carbon monoxide gas and carbon deposit, as a result of the variable charge mixed with a constant volume of burnt gas.

Various forms and shapes of compression space are being used to induce violent turbulation and mixture of the retained burnt compression space gas and the new inrushing charge, during the suction stroke, this mixture of burnt gas with the new charge reduces the power value of the combination in proportion to the percentage of burnt gas in the mixture.

To eliminate this loss, the compression space is divided or broken up into a number of small units in the form of small even bore elongated closed end tubes, attached to the combustion end of the cylinder, the tubes may be of any number, length or location, so long as they enter the cylinder space and their combined volumetric space or room equals the desired compression ratio.

It is found that with small even bore closed end tubes, turbulance or mixing of the burnt and active gasses at their junction within the tube is negligible under varying pressures, the junction of gasses being uneffected by any slight turbulation at the mouth of the tube.

Referring to Figure 1 of the drawings 6 indicates the cylinder of an internal combustion engine, 7 the piston, 8 the piston chamber or cylinder bore, 9 an intake valve for the explosive charge, 10 a spark plug and 11 a hollow water cooled head of the desired length which is secured against the outer end of cylinder 6 and provides a closure for such end. The inner end 12 of head 11 forms the outer wall of the piston chamber 8. The head 11 is flanged as at 13, 14 and the former is secured to a flange 15 on the cylinder 6 by a holdfast device 16. The flange 14 opposes the valve 9 and carries the spark plug 10. The flange 14 is seated on an extension 17 on the cylinder 6. The extension 17 provides the inlet passage or channel 18 for the explosive charge and which has its inner end formed with a valve seat 19 for valve 9 and the latter is spaced from flange 14. The cylinder 6 is cut away to provide in connection with the head 11 an inlet 20. The cylinder 6 is also formed with an outlet valve not shown. The foregoing structural arrangement, other than the head 11 is illustrated by way of example so that the arrangement of an external compression space or spaces to attain the object of the invention can be readily understood.

The head 11 provides a water space 21 for the circulation of a cooling medium for spaced compression tubes anchored to the inner end 12 of head 11, positioned within the space 21 and extending towards and spaced from the outer end 22 of head 11.

The tubes are indicated at 23 and that end thereof arranged in space 21 is closed as at 24 and the other end thereof, indicated at 25 is open, anchored to the inner end 12 of head 11 and opens permanently into the forward end of the piston chamber 8. Each tube 23 forms a compression space 26 which is external of the combustion chamber or space 8 of the engine or motor. The head 11 is formed with a cooling medium intake and outlet, 27, 28 respectively. The tube or tubes can be of any suitable length but must be formed in a manner as hereinbefore set forth.

Referring to Figure 2 the external compression space or spaces is or are shown radially disposed with respect to the cylinder. In Figure 3 the engine cylinder is indicated at 38, the piston chamber at 39, piston at 40, cylinder head at 41, intake and outlet valves at 42, 43 respectively, which are arranged in head 41, intake and exhaust passages 44, 45, respectively and spark plug 46. The cylinder 38 is formed with opposed, circumferentially extending rows of tubes 47 closed at their outer ends, as at 48 and registering at their inner ends with openings 49 formed in the cylinder wall. The tubes 47 provide compression spaces 50 permanently communicating with the piston chamber or space 39 through the openings 49. A clearance space 51 is formed at the point of joinder of head 41 with cylinder 38.

In the diagrammatical view shown in Figure 3 the various positions of the burnt or inert gas within the external compression space are shown during the operation of the engine. The external compression chamber is indicated at 63. On exhaust the burnt or inert gas is expanded as at A, on charge as at B, C, under different stages of compression, and on explosion under final stage of compression at D.

With a multiple of tubes as shown in Figure 2 each series of tubes reach the ignition point when uncovered by the piston on its journey during the power stroke, each contributing pressure to the cylinder in periods as the piston proceeds, however, the action of the gases within the tubes is the same as stated above.

Compression tubes may be arranged in the cylinder head as shown in Figure 1 and while the clearance space is reduced to a minimum, high ignition pressure could not be attained, as the compression tubes could not be cut out by the movement of the piston. Electric ignition would therefore be required. The tubes in the cylinder head are shown enclosed for water cooling.

What I claim is:

1. In an internal combustion engine, a cylinder, and plurality of spaced units providing a divided compression space external of the cylinder, each unit consisting of a tube closed at its outer end and opening at its inner end into the bore of the cylinder.

2. In internal combustion engine, a cylinder, and plurality of spaced units providing a divided compression space external of the cylinder, each unit consisting of a tube closed at its outer end and opening at its inner end directly into the bore of the cylinder, each of said tubes being elongated and of small even bore.

3. In an internal combustion engine, a cylinder, and plurality of spaced units providing a divided compression space external of the cylinder, each unit consisting of a tube closed at its outer end and opening at its inner end directly into the bore of the cylinder, and said units providing for retaining the burnt compression space gas out of turbulent contact with the incoming charge during the suction stroke of the engine.

4. In an internal combustion engine, a cylinder, and plurality of spaced units providing a divided compression space external of the cylinder, each unit consisting of a tube closed at its outer end and opening at its inner end into the bore of the cylinder, and said units providing for retaining the burnt compression space gas and to receive the active charge during the compression stroke.

5. In an internal combustion engine, a cylinder, and plurality of spaced units providing a divided compression space external of the cylinder, each unit consisting of a tube closed at its outer end and opening at its inner end into the bore of the cylinder, and said units having the combined volumetric capacity thereof equalling the required compression ratio of the cylinder.

6. In an internal combustion motor, a cylinder, and a set of tubes, arranged in spaced relation, of even bore, closed at the outer ends and opening at the inner ends thereof into the bore of the cylinder and providing the compression and combustion space for the engine.

7. In an internal combustion engine, a cylinder, and plurality of spaced units providing a divided compression space external of the cylinder, each unit consisting of a tube closed at its outer end and opening at its inner end directly into the bore of the cylinder, said tubes being attached to the forward end of the cylinder.

In testimony whereof, I affix my signature hereto.

WILLIAM P. WIEMANN.